United States Patent
Lee

(10) Patent No.: US 6,920,573 B2
(45) Date of Patent: Jul. 19, 2005

(54) ENERGY-CONSERVING APPARATUS AND OPERATING SYSTEM HAVING MULTIPLE OPERATING FUNCTIONS STORED IN KEEP-ALIVE MEMORY

(75) Inventor: Howard Hong-Dough Lee, Bloomfield, MI (US)

(73) Assignee: SmartPower Corporation, Bloomfield, MI (US)

( * ) Notice: Subject to any disclaimer, the term of this patent is extended or adjusted under 35 U.S.C. 154(b) by 655 days.

(21) Appl. No.: 09/863,177

(22) Filed: May 23, 2001

(65) Prior Publication Data

US 2002/0178390 A1 Nov. 28, 2002

(51) Int. Cl.[7] .............................. G06F 1/26; G06F 1/32
(52) U.S. Cl. ...................... 713/323; 713/300; 713/310; 713/320; 713/322; 713/324
(58) Field of Search ................................ 713/300, 310, 713/320, 322, 323, 324, 1, 2, 100

(56) References Cited

U.S. PATENT DOCUMENTS

| | | | | |
|---|---|---|---|---|
| 5,036,455 A | * | 7/1991 | Atwood ........................ 714/22 |
| 5,410,713 A | | 4/1995 | White et al. ................. 395/750 |
| 5,491,721 A | | 2/1996 | Cornelius et al. ........... 375/222 |
| 5,530,879 A | | 6/1996 | Crump et al. ................ 395/750 |
| 5,588,054 A | | 12/1996 | Shin et al. .................. 379/413 |
| 5,689,715 A | * | 11/1997 | Crump et al. ................ 713/310 |
| 5,834,856 A | * | 11/1998 | Tavallaei et al. ............. 307/64 |
| 5,974,557 A | * | 10/1999 | Thomas et al. .............. 713/322 |
| 6,035,408 A | * | 3/2000 | Huang ........................ 713/320 |
| 6,088,809 A | * | 7/2000 | Atkinson ..................... 713/324 |
| 6,098,175 A | | 8/2000 | Lee ............................. 713/320 |
| 6,141,762 A | * | 10/2000 | Nicol et al. ................. 713/300 |
| 6,240,521 B1 | * | 5/2001 | Barber et al. ............... 713/323 |
| 6,278,598 B1 | * | 8/2001 | Suzuki et al. .............. 361/93.9 |
| 6,501,999 B1 | * | 12/2002 | Cai ............................. 713/340 |

* cited by examiner

Primary Examiner—Lynne H. Browne
Assistant Examiner—James K. Trujillo

(57) ABSTRACT

A computer power supply, motherboard, and computer system each is adapted for providing multiple operating functions. Of particular importance is an energy-conserving operating function that eliminates any unnecessary energy waste and annoying noise, while allowing information processing to continue, as opposed to (1) a conventional operating state that inevitably incurs substantial energy waste and annoying noise, and to (2) a conventional suspend state that idles and deactivates information processing essentially. Of anther importance is an operating system for selectively executing a power-down process to an energy-conserving operating function and a power-up process to a full operating function. The combination of the computer power supply, the motherboard, the computer system, and the operating system provides the following distinct exemplary advantages: (1) greatly extending the battery life of a notebook or laptop computer, as a result of eliminating unnecessary energy waste during operation, (2) eliminating any annoying noise as a result of substantial energy conservation that in turn eliminates the need of cooling, and (3) affording an independent operating function to allow a user to instantly, energy-conservatively, and noise-freely play an audio disc in a CD drive without booting up the computer system.

31 Claims, 4 Drawing Sheets

ENERGY-CONSERVING APPARATUS AND OPERATING SYSTEM HAVING MULTIPLE OPERATING FUNCTIONS STORED IN KEEP-ALIVE MEMORY

FIELD OF THE INVENTION

The present invention relates to energy-conserving apparatus and operating system having multiple operating functions, and more particularly to a computer power supply, a motherboard, a computer system, and an operating system for providing (1) an energy-conserving operating function to eliminate unnecessary energy waste and annoying noise, while allowing information processing to continue and extending the life of battery especially during the course of operation, and (2) an independent operating function to allow the energy-conserving apparatus to instantly, energy-conservatively, and noise-freely perform some operations (for instance, to play an audio CD or a DVD, or to duplicate information) without a tedious, time-consuming boot/shutdown process which is otherwise necessary in conventional practice.

BACKGROUND OF THE INVENTION

Nowadays, a computer is often designed to be able to enter several states such as a normal operating state, a standby state, a suspend state, and a shutdown state. In accordance with conventional practice, these states basically render a conventional computer either operable or inoperable in terms of processing information or performing computation. In the normal operating state, a conventional power supply outputs substantial energy for consumption in its host computer in order to perform information processing or to remain operable consistently. The normal operating function consumes substantial energy and requires assistance from cooling fans to dissipate heat generated from a CPU (or microprocessor) and other electronic elements, thus subsequently incurring unpleasant or annoying noise. The more powerful is the CPU, the more concern will be on heat dissipation and energy waste as well as annoying noise. Energy waste is particularly the most concerned issue for a notebook, laptop, or other portable computer when external AC power is not available.

In the shutdown state, a conventional computer is clearly inoperable and consumes no power or very little if a keyboard-power-on function is enabled. Although energy waste is eliminated, a computer placed in the shutdown state requires a tedious, time-consuming boot process to regain its normal operating function. On the other hand, the standby or the suspend state is provided for exiting the normal operating state temporarily in order to conserve energy. Both states are often referred to as the so-called sleep state in general. U.S. Pat. No. 5,530,879 defines that as compared with the standby state, the suspend state conserves extra power by saving the activities of a computer to its hard-disk drive so as to deactivate a conventional computer further. In a newer version of Windows' operating systems, this approach is used in the so-called hibernation process, which requires a slightly longer time to restore the previous activities as compared with a regular boot process. In contrast to the conventional practice, Applicant's pending application Ser. No. 09/293,089 filed on Apr. 16, 1999, now U.S. Pat. No. 6,341,354, discloses an energy-conserving motherboard and computer each comprising keep-alive random access memory for saving previous activities thereto and thus rendering the energy-conserving computer instantly accessible from the suspend state. Applicant's U.S. Pat. No. 6,341,354 is a continuation in part of Applicant's another U.S. Pat. No. 6,098,175 and claims priority thereto under 35 U.S.C. §120. In Applicant's U.S. Pat. No. 6,089,175, the feature of Suspend To Ram is firstly disclosed, lines 25–28 and 41–47, column 7. The so-called STR (i.e., Suspend To Ram) motherboards and the so-called IAPCs (i.e., instant accessible PCs or computers) currently produced are respectively the energy-conserving motherboard and computer disclosed in Applicant's pending application Ser. No. 09/293,089, now U.S. Pat. No. 6,341,354. While there are some differences in energy savings and quickness in returning to operation between the standby and the suspend states, a conventional computer placed into either state is deemed inoperable because information processing is basically ceased and requires a wakeup process to resume to the normal operating state.

Similarly, although providing these different states, a conventional operating system allows a computer only to operate or not to operate. Again, the standby or the suspend state provided by the conventional operating system basically disables the normal operating function in order to accomplish energy conservation while offers a quicker return to operation as compared with the shutdown state or the hibernating state. In other words, the conventional operating system accomplishes some energy conservation by idling computation or disabling information processing. Essentially, neither state allows information to be processed or computation to be performed. Consequently, the selection between conserving energy and processing information is constantly in a dilemma, because there exists no other alternative in between. For example, a user has to go through a tedious, time-consuming boot process even if it is simply to play an audio CD. Once booted, the conventional computer entered the normal operating state has to consume substantial energy mostly wasted and to incur annoying noise in order to dissipate the heat generated from the energy wastes. At the end of playing, another tedious, time-consuming shutdown process is further necessary. In view of these inconvenience and disadvantages, a user is then forced to additionally purchase a standalone CD player for the same purpose of reproducing digital music. Another similar dilemma is to play a DVD in the conventional computer.

Conventional wisdom keeps pushing for high-power microprocessors and faster computers, even though they are already speedy enough. Similarly, conventional operating systems become sophisticated enough for conserving energy but only in the standby or the suspend state. Thus, energy waste will remain increasingly substantial and uncontrollable in the normal operating state as a microprocessor becomes more powerful and power hungry. Previously, Applicant's U.S. Pat. No. 6,098,175 discloses energy-conserving power-supply systems. Unlike the conventional wisdom, Applicant's present invention for the first time identifies several unrecognized problems: (1) no operating system is able to eliminate energy waste in the operating state, (2) no computer power supply is capable of providing an energy-conserving operating function to a desktop computer without incurring unpleasant and annoying noise, (3) no motherboard is designed to have an energy-conserving operating function to allow information processing to continue without incurring unnecessary energy waste, (4) neither a notebook nor portable computer can extend the life of battery by eliminating unnecessary energy waste during operation, (5) neither a desktop nor portable computer allows a user to play an audio CD without requiring a tedious, time-consuming boot and then shutdown process, and without incurring necessary energy waste as well as annoying noise. Also for the first time, Applicant's present invention further solves these unrecognized problems and provides solutions to unworkable operating systems. Especially solved here are: (1) to provide an operating system to eliminate unnecessary energy waste during operation, (2) to provide a computer power supply with an energy-conserving operating function and an independent operating function as well, (3) to provide an energy-conserving motherboard with multiple operating functions for allowing a computer to conserve energy while in operation, as well as to eliminate the need of shutting down and rebooting, (4) to provide a notebook or portable computer capable of extending its battery life by eliminating unnecessary energy waste especially during operation, (5) to provide a desktop or a notebook computer capable of playing an audio CD or DVD without requiring a tedious, time-consuming boot/shutdown process and without incurring unnecessary energy waste as well as annoying noise, for the first time.

SUMMARY OF THE INVENTION

Accordingly, a first primary preferred embodiment of the present invention is to provide a computer power-supply system comprising (a) a first DC power supply for providing a first operating function to a computer, (b) cooling means coupled to the first DC power supply, (c) a second DC power supply for providing a second operating function in which the cooling means does not have to be activated, (d) a third DC power supply for providing a standby function in which at least the first DC power supply is deactivated, (e) power output connector means for respectively outputting the first DC power supply, the second DC power supply, and the third DC power supply, and (f) control means for selectively activating the first DC power supply, the second DC power supply, and the third DC power supply to output various DC power at least to the power output connector means so as to respectively provide the first operating function, the second operating function, and the standby function to the computer. Preferably afforded is means for providing the first DC power supply, the second DC power supply, and the third DC power supply, wherein the means for providing comprises at least one power provider selected from the group consisting of non-rechargeable battery, rechargeable battery, power-generating circuitry for generating DC power from AC power, and their combinations. The power-generating circuitry is provided for inputting AC power and for converting the AC power selectively to the first DC power supply, the second DC power supply, the third DC power supply and their combinations, preferably with respective power ratings. The cooling means may comprise at least one cooling fan rendered temperature sensitive so as to be actuated only when the temperature of computer power-supply system exceeds a preset value. The power output connector means comprises (i) a first connector means connectable with a computer motherboard (or system board) for outputting at least the first DC power supply and the third DC power supply thereto; (ii) a plurality of second connector means coupled to the first DC power supply, each for establishing power connection with a peripheral device in communication with the computer motherboard; and (iii) at least one third connector means each coupled to the first DC power supply and the second DC power supply; and wherein the control means is adapted to comprise (i) a first means signal-actuatable for deactivating both the first DC power supply and the second DC power supply to provide only the standby function to the first connector means, and (ii) a second means manually-operable for activating the second DC power supply to provide only the second operating function to the at least one third connector means. The control means is adapted in a manner for selectively activating the first DC power supply, the second DC power supply, the third DC power supply and any of their combinations, i.e., either alone or at any of the combinations at the same time. Preferably, the control means is adapted in a manner (i) for activating the first DC power supply, the second DC power supply and the third DC power supply at the same time to provide a full operating function, (ii) for activating the second DC power supply and the third DC power supply but not for activating the first DC power supply to provide an energy-conserving operating function, (iii) for activating only the second DC power supply to provide an independent energy-conserving operating function, and (iv) for activating only the third DC power supply to provide the standby function. The control means is further adapted for activating the second DC power supply at a condition selected from the group consisting of when the first DC power supply is activated or deactivated, when the third DC power supply is activated or deactivated, and their combinations, so as to allow a peripheral device coupled to the second DC power supply to proceed with the second operating function at various conditions. The control means may be energized by the third DC power supply, standby power, or keep-alive power so as to allow at least the first operating function to be reactuatable.

A second primary preferred embodiment of the present invention is to provide an energy-conserving computer motherboard having multiple operating functions, comprising: (a) first power-distributing circuitry actuatable for providing a first operating function, wherein the first power-distributing circuitry is arranged for establishing power connection with main microprocessor circuitry and/or with means for cooling the main microprocessor circuitry; (b) second power-distributing circuitry actuatable for providing a second operating function to allow information processing to proceed without activating the main microprocessor circuitry and/or the means for cooling; and (c) control means for selectively activating the first power-distributing circuitry and the second power-distributing circuitry, so as to respectively provide the first operating function and the second operating function. Preferably, the second power-distributing circuitry is arranged (1) for establishing power connection further with random access memory circuitry, nonvolatile memory storage, and auxiliary video circuitry, so as to render the energy-conserving motherboard energy-conserving, less noisy, and fully operable for processing information, yet without activating the first power-distributing circuitry; and (2) for establishing power connection further with audio circuitry so as to provide the second operating function for allowing audio information processing to be produced when the first power-distributing circuitry is activated or deactivated. Further comprised is third power-distributing circuitry for providing a standby function in which both the first power-distributing circuitry and the second power-distributing circuitry are deactivated, wherein the third power-distributing circuitry is arranged for establishing power connection with standby circuitry so as to reactivate at least one of the first operating function and the second operating function. Further comprised is fourth power-distributing circuitry coupled to an external input means for providing a keyboard-power-on function therefrom, wherein the fourth power-distributing circuitry is arranged for establishing power connection with the control means so as to be responsive to a boot-request signal from the external input means for activating the first power-distributing circuitry from a shutdown state in which the first power-distributing circuitry, the second power-distributing circuitry and the third power-distributing circuitry are all deactivated. The third power-distributing circuitry is arranged for establishing power connection with (1) audio circuitry so as to allow the standby function to produce audio information; and with (2) keep-alive memory circuitry for storing information needed to selectively resume the previous activities of the first operating function or the second operating function. The control means is adapted in a manner for (1) activating the second power-distributing circuitry to provide the second operating function when the standby circuitry receives an incoming communication signal; and (2) activating the second power-distributing circuitry at a condition selected from the group consisting of when the first power-distributing circuitry is activated or deactivated, when the third power-distributing circuitry is activated or deactivated, and their combinations. The control means is further rendered in a manner for selectively (i) activating the first power-distributing circuitry, the second power-distributing circuitry and the third power-distributing circuitry at the same time to provide a full operating function; (ii) activating the second power-distributing circuitry and the third power-distributing circuitry without activating the first power-distributing circuitry to provide an energy-conserving operating function; (iii) activating only the second power-distributing circuitry to provide an independent energy-conserving operating function; and (iv) activating only the third power-distributing circuitry to provide the standby function. Alternatively, the control means is adapted for (1) deactivating the first power-distributing circuitry when detecting an activity of the main microprocessor circuitry is below a preset value; and (2) activating the first power-distributing circuitry when detecting the activity of auxiliary microprocessor circuitry is above a preset value. The control means comprises a first means actuatable in response to a signal for selectively activating or deactivating the first power-distributing circuitry and a second means manually-operable for selectively activating or deactivating the second power-distributing circuitry.

A third primary preferred embodiment of the present invention is to provide an energy-conserving computer system having multiple operating functions, comprising: (a) a first group of circuitry actuatable for providing a first operating function, wherein the first group of circuitry comprises main microprocessor circuitry and/or means for cooling the main microprocessor circuitry; (b) a second group of circuitry actuatable for providing a second operating function that does not require to activate the main microprocessor circuitry and/or the means for cooling; (c) a third group of circuitry actuatable for providing a standby function, wherein the third group of circuitry comprises standby circuitry for rendering at least the first group of circuitry resumable to previous activities; (d) power providing means for providing power to the first group of circuitry, the second group of circuitry, and the third group of circuitry; and (e) control means for controlling the power providing means to selectively activate the first group of circuitry, the second group of circuitry, and the third group of circuitry, so as to respectively provide the first operating function, the second operating function, and the standby function. Preferably, the second group of circuitry is adapted to comprise auxiliary microprocessor circuitry, volatile memory storage, nonvolatile memory storage (such as battery-powered random-access memory, at least one hard-disk drive, at least one optical disc drive, and their combinations), and auxiliary video circuitry, so that the information-processing apparatus is rendered energy-conserving, less noisy, and fully operable, yet without requiring to activate the main microprocessor circuitry and the means for cooling. The power providing means comprises at least one power provider selected from the group consisting of non-rechargeable battery, rechargeable battery, power circuitry for generating various DC power from AC power, and their combinations, for providing a first DC power supply, a second DC power supply, a third DC power supply, and their power combinations respectively to the first group of circuitry, the second group of circuitry, the third group of circuitry, and their group combinations. Preferably, the power providing means comprises rechargeable battery and the control means is adapted in a manner for controlling the rechargeable battery not to energize the first group of circuitry when detecting an activity of the main microprocessor circuitry is below a preset value, so as to conserve the power of the rechargeable battery for use in conjunction with a notebook or portable computer. The control means is further adapted for controlling the power providing means in such a manner as (1) to deactivate the first group of circuitry when detecting an activity of the main microprocessor circuitry is below a preset value and (2) to activate the first group of circuitry when detecting an activity of auxiliary microprocessor circuitry is above a preset value. The control means is further adapted selectively for (i) activating the first group of circuitry, the second group of circuitry, and the third group of circuitry at the same time to provide a full operating function, (ii) activating the second group of circuitry and the third group of circuitry without activating the first group of circuitry to provide an energy-conserving operating function, (iii) activating only the second group of circuitry to provide an independent energy-conserving operating function, and (iv) activating only the third group of circuitry to provide the standby function. Comprised in the control means are (i) a first means actuatable in response to a signal for controlling the power providing means to selectively activate or deactivate the first group of circuitry and (ii) a second means manually-operable for controlling the power providing means to selectively activate or deactivate the second group of circuitry. The standby circuitry comprises (i) keep-alive or standby random access memory (energized by battery or standby power) for storing task information of previous activities to be resumed, and (ii) control circuitry responsive to a reactivating signal for reactivating the task information. Preferably, a central processor unit is provided to comprise the main microprocessor circuitry comprised in the first group of circuitry and the auxiliary microprocessor circuitry comprised in the second group of circuitry. An optical disc drive and a fourth group of circuitry can be provided and arranged for providing a music playing function at a condition when the first group of circuitry, the second group of circuitry, and the third group of circuitry are all deactivated. Similarly, two optical disc drives can be arranged for providing a read and write function therebetween. The means for cooling can be rendered temperature sensitive so as to be actuated only when the temperature of a preselected area exceeds a preset value.

A fourth primary preferred embodiment of the present invention is to provide an operating system for controlling an activity of an information-processing apparatus having main microprocessor circuitry and/or auxiliary microprocessor circuitry, the operating system comprising the instructions of: (a) monitoring an activity of the main microprocessor circuitry or the auxiliary microprocessor circuitry; (b) comparing the activity with a preset value; (c) deactivating the main microprocessor circuitry, if the activity has a value smaller than the preset value; and (d) activating the main microprocessor circuitry, if the activity has a value greater than the preset value. Further comprised are additional instructions (1) for activating the auxiliary microprocessor circuitry if the activity has a value greater than zero but smaller than the preset value, wherein the preset value is greater than zero; (2) for deactivating the auxiliary microprocessor circuitry if the activity has a value of zero; (3) for saving any modified files to nonvolatile memory storage, when deactivating the auxiliary microprocessor circuitry; (4) for saving the activities of the information-processing apparatus to keep-alive random access memory if to request the deactivating of the auxiliary microprocessor circuitry; (5) for activating the main microprocessor circuitry if detecting a request signal; (6) for activating the main microprocessor circuitry only if the activity has a time value greater than a preset time value; and (7) for deactivating the main microprocessor circuitry and for activating the auxiliary microprocessor circuitry if the activity has a value greater than zero, but not greater than the preset value.

DETAILED DESCRIPTION OF THE PREFERRED EMBODIMENT

A first primary preferred embodiment of the present invention is to provide a computer power-supply system for affording multiple operating functions to a hosting computer. Of particular importance is to provide an energy-conserving operating function and/or an independent operating function, in addition to a normal (or full) operating function, so as to eliminate unnecessary energy waste while allowing information processing or computation to continue to proceed.

Figure 1:
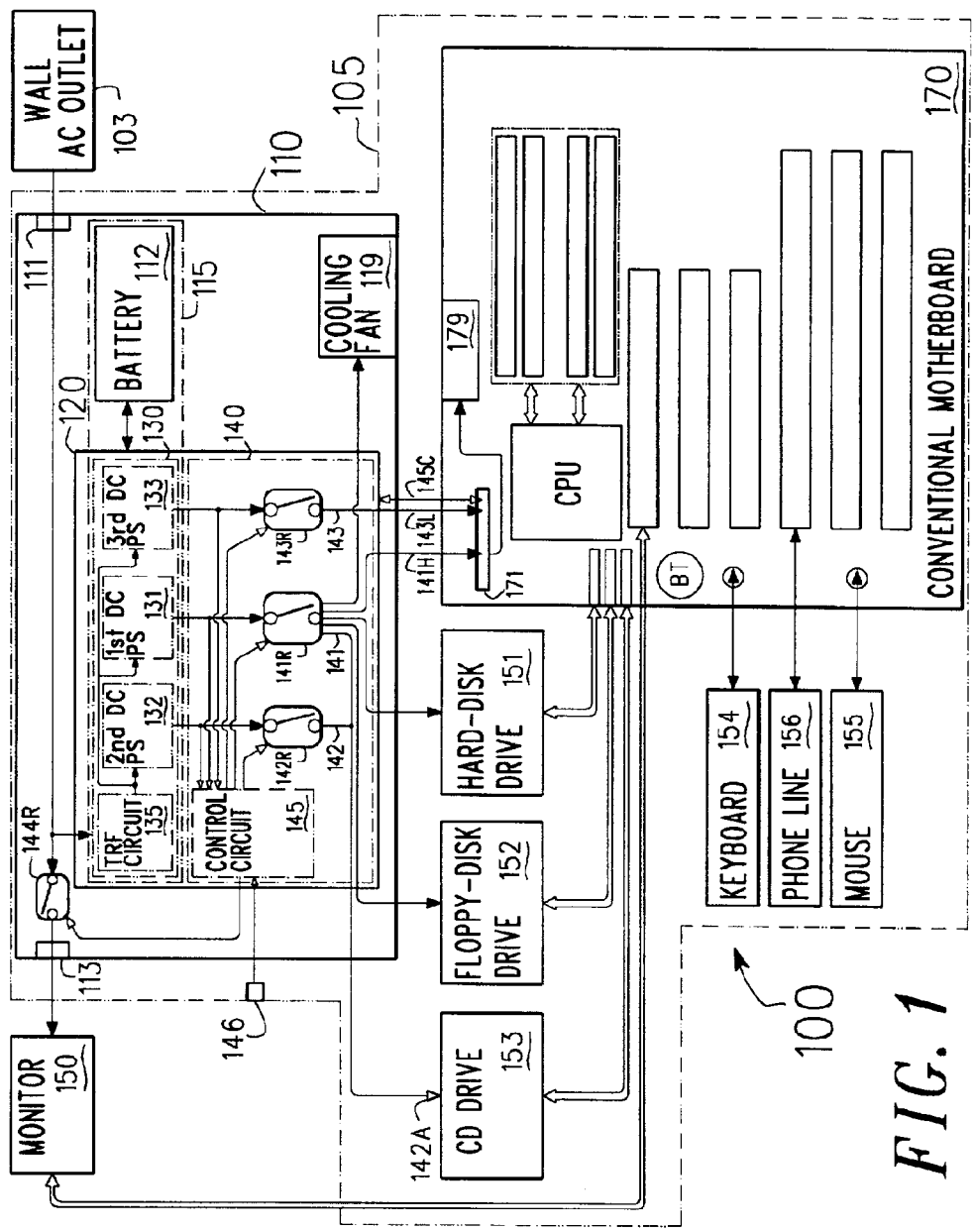
FIG. 1 is a block diagram of an energy-conserving power-supply system capable of providing multiple operating functions to a conventional computer, in accordance with a first primary preferred embodiment of the present invention.

Referring now to FIG. 1, illustrated is a block diagram of an energy-conserving power-supply system 110 of the present invention to power a conventional motherboard 170 and several peripheral drives shown in an energy-conserving computer system 100. Comprised in energy-conserving power-supply system 110 are an AC-power receptacle 111 for receiving AC power from a wall AC outlet 103 (i.e., an external AC source) controllably to an AC outlet 113 and a power circuit board 120. In power connection to power circuit board 120 is a battery 112 for providing backup power when the AC power is suddenly absent. For facilitating illustration, power circuit board 120 is defined to comprise a power generating circuit 130 and a control circuit 140. Collectively, battery 112 and power-generating circuit 130 are defined as a power provider 115 hereinafter because of having the same function, i.e., providing power. Comprised in power-generating circuit 130 are a TRF circuit 135 for performing power transformation, rectification and filtering, a first DC power supply circuit 131 for providing a first DC power supply 141, a second DC power supply circuit 132 for a second DC power supply 142, and a third DC power supply circuit 133 for a third DC power supply 143. Control circuit 140, which may include a pulse-width modulator (PWM) element, is adapted (1) for comparing output voltage sample to a reference voltage and generating error voltages to respective DC power supply circuits 131–133 and (2) for controlling switches 141R–143R to selectively activate first DC power supply 141, second DC power supply 142, third DC power supply 143 and their combinations. Switches 141R–143R are shown here for simplifying illustration, as they may be replaced by switching transistors (such as NPN, PNP, FET, and their combinations) and arranged in such a manner as to selectively enable the first, the second, and the third DC power supply circuits 131–133 to receive power input from TFR circuit 135. Control circuit 140 also controls a switch 144R to selectively output AC power to AC outlet 113 for energizing a monitor 150 only when entering a normal or full operating state.

First DC power supply 141 selectively actuatable by switch 141R provides a first operating function, only when full power is needed, through a plurality of connectors connected to a conventional motherboard 170, a hard-disk drive 151, a floppy-disk drive 152, and an enclosed cooling fan 119. Second DC power supply 142 selectively actuatable by switch 142R provides a second operating function through an output connector 142A to a CD drive 153. Preferably, output connector 142A is color coded or printed with identified letters such as for use with a CD drive or for indicating an energy-conserving or independent operating function. Third DC power supply 143 selectively actuatable by switch 143R provides a third operating function, when entering a standby state that requires very limited power, to conventional motherboard 170. The third operating function, which may be called as a standby function here, provides standby power for allowing energy-conserving computer system 100 to be resumable especially to the previous activities of the first operating function when receiving a request signal from an external input means such as a keyboard 154, a mouse 155, or a phone line 156. Energy-conserving power-supply system 110 has a main connector 171 (with 20 pins or the so-called ATX-type connector) coupled to the first DC power supply and the third DC power supply respectively through power lines 141H and 143L, which is connectable (and currently connected) to conventional motherboard 170 for providing several power ratings thereto. Note that line 141H includes several power lines for providing ±12 VDC, ±5 VDC, powergood, and ground, while 143L mainly includes +5VSB for the standby function. The main connector also comprises a control line 145C for receiving +3.3V sense from conventional motherboard 170 to power circuit board 120 so as to allow control circuit 145 to selectively provide the first operating function when requested. A CPU cooling fan 179 is arranged to received the first DC power supply through line 141H, so as to cease rotation when the first operating function is not provided. As a result, there is no unnecessary annoying noise incurred by CPU cooling fan 179 and cooling fan 119.

Output connector 142A is further arranged in such a manner as to receive first DC power supply 141 when the first operating function is provided. Consequently, CD drive 153 is operable selectively either when the first operating function or when the second operating function is provided. Especially, when the first operating function is not provided, the second operating function becomes independent. Preferably, energy-conserving power-supply system is substantially enclosed or installed in a computer case or housing 105. Further disposed on the external side of computer case 105 is a manually-operable means 146 for independently activating second DC power supply 142 through requesting control circuit 145 to actuate switch 142R. Alternatively, switch 142R may be integrated into manually-operable means 146 to directly control the provision of second DC power supply 142. In this case, if first DC power supply 141 needs to be actuatable, the standby power from third DC power supply circuit 133 should be also provided to control circuit 145 unless another power supply is further provided. When installed in computer case 105, the energy-conserving power-supply system of the present preferred embodiment becomes the so-called computer housing (or case) system (with an enclosed power supply) or computer barebone system products. However, a computer housing system or barebone system of the present invention is capable of providing multiple operating functions, for the first time. Specifically, manually-operable means 146 allows CD drive 153 to play audio CD for producing music through an outlet to an earphone or further connected to speakers (not shown), even when energy-conserving computer system 100 (or the computer case or the computer barebone system) is in a shutdown state.

In brief, energy-conserving power-supply system 110 comprises (a) a first DC power supply for providing a first operating function to a computer, (b) cooling means coupled to the first DC power supply, (c) a second DC power supply for providing a second operating function that does not require to activate the cooling means, (d) a third DC power supply actuatable for providing a standby function to replace at least the first operating function, so as to allow at least the first DC power supply to be deactivated for not providing the first operating function and to be reactuatable for providing the first operating function, (e) power output connector means for respectively outputting the first DC power supply, the second DC power supply, and the third DC power supply, and (f) control means for selectively activating the first DC power supply, the second DC power supply, and the third DC power supply to the power output connector means so as to respectively provide the first operating function, the second operating function, and the standby function to the computer.

Preferably, energy-conserving power-supply system 110 is adapted to comprise means 115 for providing the first DC power supply, the second DC power supply, and the third DC power supply, wherein the means for providing comprises at least one power provider selected from the group consisting of non-rechargeable battery, rechargeable battery, power-generating circuitry for generating DC power from AC power, and any of their combinations. As controlled by the control means, the power-generating circuitry is provided for inputting AC power and for converting the AC power selectively to the first DC power supply, the second DC power supply, the third DC power supply and their combinations, preferably with respective power ratings. In general, the first DC power supply, the second DC power supply, and the third DC power supply are adapted to be in a decreasing sequence of power ratings. Cooling fan 119 can be further rendered temperature-sensitive so as to be actuated only when the temperature of energy-conserving power-supply system exceeds a preset value.

The control means is adapted in a manner for selectively activating the first DC power supply, the second DC power supply, the third DC power supply and any of their combinations, either alone or at the same time. Preferably, the control means is further adapted in a manner selectively (i) for activating the first DC power supply, the second DC power supply and the third DC power supply at the same time to provide a full operating function, (ii) for activating the second DC power supply and the third DC power supply but deactivating the first DC power supply to provide an energy-conserving operating function, (iii) for activating only the second DC power supply to provide an independent energy-conserving operating function, and (iv) for activating only the third DC power supply to provide the standby function. The control means is further adapted to activate the second DC power supply at a condition selected from the group consisting of when the first DC power supply is activated or deactivated, when the third DC power supply is activated or deactivated, and their combinations, so as to allow a peripheral device (currently CD drive 153) coupled to the second DC power supply to proceed with the second operating function at various conditions. The control means comprises a first switching means actuatable in response to a request signal for selectively activating or deactivating the first DC power supply and a second switching means manually-operable for selectively activating or deactivating the second DC power supply.

Consequently, energy-conserving power-supply system 110 of the present invention allows a user to enjoy music with the following advantages: (1) elimination of unnecessary energy waste because of no need to power up its hosting computer, (2) convenience and time saving at least for instant enjoyment of music without requiring a tedious and time-consuming boot/shutdown process which otherwise is an essential step in accordance with the conventional practice, (3) more pleasant enjoyment because of no annoying noise from cooling fans when the second operating function or the standby function is provided, and (4) substantial cost savings because of eliminating the need to purchase a standalone CD player. an energy-conserving computer system 200 utilizing.

Figure 2:
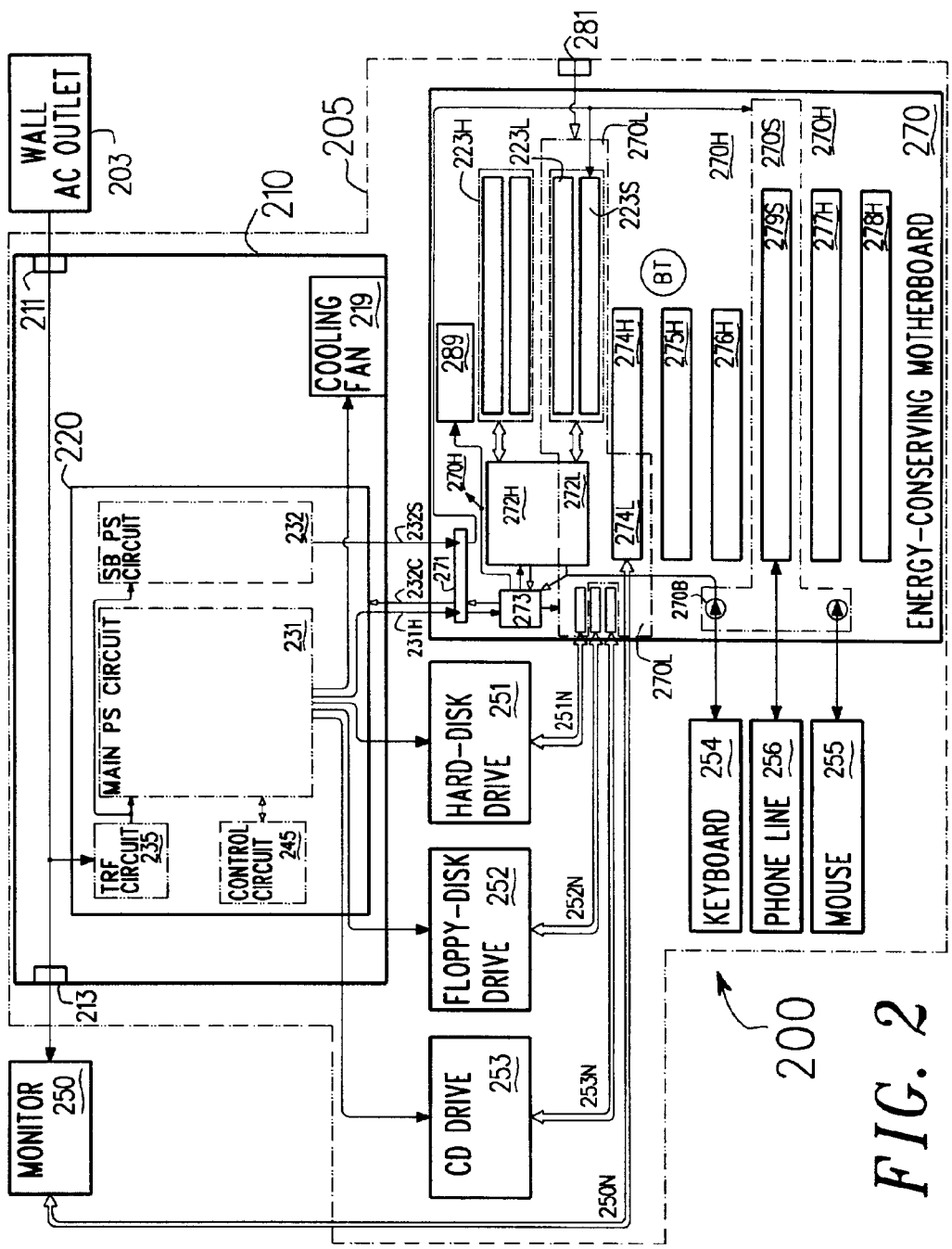
FIG. 2 is a block diagram of an energy-conserving motherboard powered by a conventional computer power supply, in accordance with second and third primary preferred embodiments of the present invention.

Referring now to FIG. 2, in accordance with a second primary preferred embodiment of the invention, illustrated is a block diagram showing an energy-conserving motherboard (or system board) 270 powered by a conventional power-supply system 210, which forms an energy-conserving computer 200 having multiple operating functions.

Comprised in conventional power-supply system 210 are an AC-power receptacle 211 for receiving AC power from a wall AC outlet 203, a cooling fan 219 and a power circuit board 220 which has a TRF circuit 235, a main power supply circuit 231, a standby power supply circuit 232, and a control circuit 245, for providing main DC power and standby power. If used in conjunction with a conventional motherboard, the main DC power of conventional power-supply system 210 provides only a normal operating state in which full consumption of power proceeds regardless of whether information processing is ceased or in operation. Only when entering the standby or suspend state, the main DC power is deactivated and replaced by the standby power. As a result, the conventional computer cannot conserve energy in the normal operating state.

While conventional wisdom keeps pushing for high-power microprocessors and faster computers, Applicant perceives that the need for high-power computation is often momentary. Specifically, after a computer is booted and information is loaded, a user will spend most of the time in reading or writing that is at a speed not even comparable with a slowest computer. There is no rational logic to waste full power for maintaining the high-power microprocessor in operation all the time. Thus, for the first time, it is the present invention to provide energy-conserving motherboard 270 with an energy-conserving operating function in which unnecessary high-power computation, unnecessary energy waste, and unnecessary annoying noise are all eliminated.

With the advent of energy-conserving motherboard 270 in accordance with the second primary preferred embodiment, for the first time, it is possible to conserve energy while a computer is in operation. Specifically, energy-conserving motherboard 270 provides multiple operating functions, instead of a single normal operating function used in the conventional practice. This is achieved by adapting energy-conserving motherboard 270 to comprise first power-distributing circuitry 270H for providing a first operating function, second power-distributing circuitry 270L for providing a second operating function, and control means, which is totally different from conventional motherboard 170 shown in FIG. 1 from the view point of power distributing and characteristics. Energy-conserving motherboard 270 is connectable for receiving typical main power 231H and standby power 232S through a main power connector 271 (with 20 pins) of conventional power-supply system 210. In contrast to the conventional motherboard, energy-conserving motherboard 270 eliminates any power consumption in the area confined within first power-distributing circuitry 270H when entering the second operating function.

For improving illustration, note that all of the elements or circuitry disposed on energy-conserving motherboard 270 are categorized into three groups in terms of power consumption, i.e., a first group, a second group, and a third group of circuitry with reference numerals ended with "H," "L," and "S," for respectively associating with first, second, and third power-distributing circuitry.

First power-distributing circuitry 270H is arranged for establishing power connection with main microprocessor circuitry 272H for performing computation and means 289 (which may include two fans) for cooling main microprocessor circuitry 272H during the computation. Further connected to first power-distributing circuitry 270H are main volatile memory storage (or RAM) 223H, main video circuitry 274H, expansion slots (for input/output) 275H–278H, and other connectors for connecting buses 252N and 253N respectively to a floppy-disk drive 252 and a CD drive 253. Second power-distributing circuitry 270L provides a second operating function in which first power-distributing circuitry 270H is deactivated, wherein second power-distributing circuitry is arranged not for establishing power connection with main microprocessor circuitry 272H and means 289 for cooling. Instead, second power-distributing circuitry 270L is arranged for establishing power connection with auxiliary microprocessor circuitry for performing low speed computation, in which power consumption is considerably lower than first power-distributing circuitry 270H as power-hungry main microprocessor circuitry 272H and its means 289 for cooling are deactivated. Second power-distributing circuitry is further arranged for establishing power connection with auxiliary volatile memory storage (or RAM) 223L, standby RAM 223S, nonvolatile memory storage which may be battery-powered RAM (random-access memory) and/or hard-disk drive 251 connected through a connecting bus 251N, and auxiliary video circuitry 274L which has less memory and thus a lower speed in processing video information, so that the energy-conserving motherboard is rendered fully operable by a user to play a DVD, yet consumes much less energy and incurs no annoying noise during operation through deactivating first power-distributing circuitry 270H.

Further comprised is third power-distributing circuitry 270S for providing a standby function in which first power-distributing circuitry 270H and second power-distributing circuitry 270L are deactivated, so as to not establish power connection at least with main microprocessor circuitry 272H and means 289 for cooling. Instead, third power-distributing circuitry 270S is arranged for establishing power connection with standby circuitry for reactivating at least one of first power-distributing circuitry 270H and second power-distributing circuitry 270L, especially to resume previous activities associated with either first operating function or second operating function. The standby circuitry comprises control circuitry 273, standby RAM 223S for serving as keep-alive memory to store task information needed for resuming the previous activities (associated with either the first operating function or the second operating function), a communication card 279S, and external input means such as keyboard 254 and mouse 255 manually operable for reactivating the previous activities.

Optionally comprised is power-distributing circuitry 270B coupled to keyboard 254 and arranged for establishing power connection with part of control circuitry 273, and to power circuit board 220 (through a control line 232C), for providing a boot function therefrom. The part of control circuitry 273 utilizes 720 mA of power to enable a keyboard-power-on function, i.e., allowing a boot-request signal to be sent from keyboard 254 for activating first power-distributing circuitry 270H from a shutdown state in which first power-distributing circuitry 270H, second power-distributing circuitry 270L and third power-distributing circuitry 270S are all deactivated. Normally, the 720 mA of power is provided by 5.0VSB that vanishes if AC power or main power connector 271 is unplugged for a certain period of time and so will the keyboard-power-on function.

The control means is provided for selectively activating first power-distributing circuitry 270H and second power-distributing circuitry 270L, so as to respectively provide the first operating function and the second operating function. It is adapted to comprise control circuitry 273 coupled to receive main DC power from main power connector 271. Though may be in different configurations, control circuitry 273 shown in FIG. 2 is arranged for providing both the standby function (by activating third power-distributing circuitry 273S) as well as the control function described hereafter. With respect to the control function, control circuitry 273 is adapted to comprise switching transistors (such as NPN, PNP, FET, and their combinations) forming a first means actuatable (integrated in control circuitry 273) in response to a signal for selectively activating or deactivating first power-distributing circuitry 270H and a second means 281 (disposed on the outside of computer case 205) manually-operable for selectively requesting and/or activating or deactivating second power-distributing circuitry 270L. Consequently, control circuitry 273 is adapted for providing (1) a first DC power supply to first power-distributing circuitry 270H for establishing power connection with main microprocessor circuitry 272H, means 289 for cooling, and other corresponding circuitry, so as to provide the first operating function, (2) a second DC power supply to second power-distributing circuitry for establishing power connection with auxiliary microprocessor circuitry 272L, auxiliary video circuitry 274L, and other corresponding circuitry, so as to provide the second operating function, and (3) a third DC power supply to third power-distributing circuitry 270S for establishing power connection with external input means, communication card 279S, and standby RAM 223S, so as to provide the standby function.

Control circuitry 273 is further adapted in a manner (1) for monitoring an activity of main microprocessor circuitry 272H when the first operating function is provided, and for deactivating first power-distributing circuitry 270H when detecting the activity of main microprocessor circuitry 272H is below a preset value, and (2) for monitoring an activity of auxiliary microprocessor circuitry 272L when the second operating function is provided, and for activating first power-distributing circuitry 270H when detecting the activity of auxiliary microprocessor circuitry is above a preset value. Preferably, the control means is adapted in a manner for activating second power-distributing circuitry 270L to provide the second operating function when standby circuitry 270S receives an incoming communication signal, which does not require high-power computation. It is further adapted in a manner for activating second power-distributing circuitry 270L at a condition selected from the group consisting of when first power-distributing circuitry 270H is activated or deactivated, when third power-distributing circuitry 270S is activated or deactivated, and their combinations. Alternatively, the function of energy-conserving computer system 200 is provided by increasing or decreasing the number of power-distributing circuitry to be activated. Thus, the control means is further adapted in a manner for selectively (i) activating first power-distributing circuitry 270H, second power-distributing circuitry 270L and third power-distributing circuitry 270S at the same time to provide a full operating function, (ii) activating second power-distributing circuitry 270L and third power-distributing circuitry 270S without activating first power-distributing circuitry 270H to provide an energy-conserving operating function, (iii) activating only second power-distributing circuitry 270L to provide an independent energy-conserving operating function, and (iv) activating only third power-distributing circuitry 270S to provide the standby function.

Figure 3:
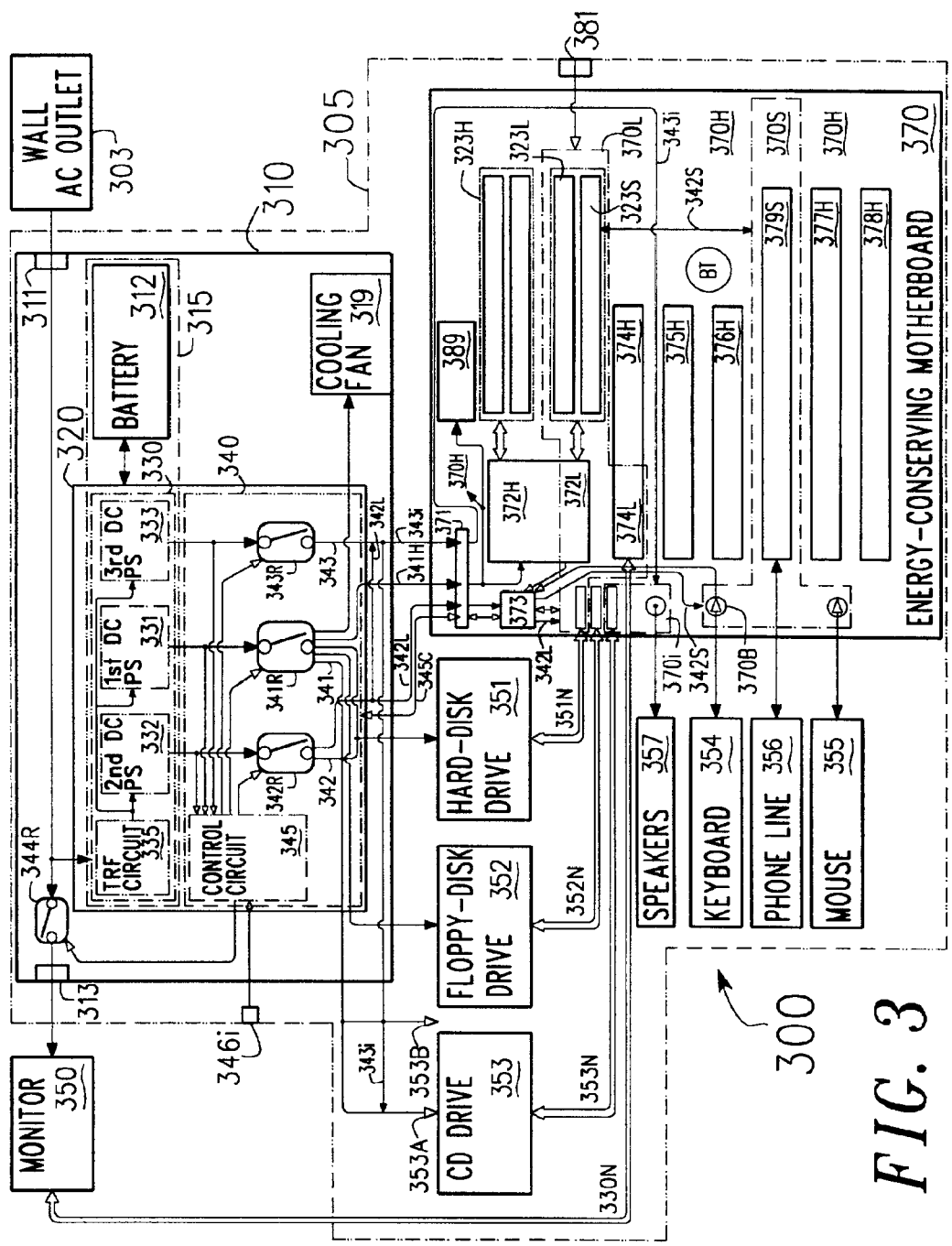
FIG. 3 is a block diagram of an energy-conserving computer comprising energy-conserving power-supply system and energy-conserving motherboard for providing multiple operating functions, in accordance with first, second and third primary preferred embodiments of the present invention.

Referring now to FIG. 3, in accordance with first, second, third primary preferred embodiments of the invention, illustrated is a block diagram of an energy-conserving computer system 300 (i.e., an information-processing apparatus) utilizing an energy-conserving power-supply system 310 and energy-conserving motherboard 370.

In accordance with the first primary preferred embodiment, FIG. 3 shows energy-conserving power-supply system 310 comprising (a) a first DC power supply 341 for providing a first operating function, (b) a cooling fan 319 coupled to first DC power supply 341, (c) a second DC power supply 342 for providing a second operating function that does not require to activate first DC power supply 341, (d) a third DC power supply 343 for providing an independent operating function that does not require to activate both first DC power supply 341 and second DC power supply 342, (e) controlled AC power to AC outlet 313 then to a monitor 350, and (f) control means (including a control circuit 345 and switch means 341R–343R) for selectively activating first DC power supply 341, second DC power supply 342, third DC power supply 343, and their combinations to various power output connectors, so as to respectively provide the first operating function, the second operating function, the standby function, and their combinations to the energy-conserving computer system 300. The control means are further arranged in a manner for activating only second DC power supply 342 to power output connectors 353A and 353B and to an independent power-distributing circuitry 370*i* (on energy-conserving motherboard 370) so as to provide an independent energy-conserving operating function for playing an audio CD.

In accordance with the second primary preferred embodiments, FIG. 3 shows energy-conserving motherboard 370 comprising (a) first power-distributing circuitry 370H for providing a first operating function, wherein first power-distributing circuitry 370H is arranged for establishing power connection with main microprocessor circuitry 372H and means 389 for cooling main microprocessor circuitry 372H; (b) second power-distributing circuitry 370L for providing a second operating function that does not require to activate first power-distributing circuitry 370H is deactivated, wherein second power-distributing circuitry 370L is arranged preferably for establishing power connection with auxiliary microprocessor circuitry 370L; and (c) control means (including control circuitry 373) for selectively activating first power-distributing circuitry 370H and second power-distributing circuitry 370L, so as to respectively provide the first operating function and the second operating function. Alternatively, control circuitry 373 may be replaced by auxiliary microprocessor circuitry 370L.

Energy-conserving motherboard 370 is basically similar to that shown in FIG. 2, except for additionally providing an independent operating function in which a CD drive 353 coupled to color coded power output connector 353A is allowed to produce music at any condition especially when energy-conserving computer system is and staying in the standby state or even in the shutdown state. The independent operating function is achieved by providing third DC power supply 343 to CD drive 353 through power line 343*i* and to independent power-distributing circuitry 370*i* for activating speakers 357, a connector for establishing power connection with a connecting bus 353N (to CD drive 353), and audio circuitry (confined in the area of independent power-distributing circuitry 370*i*) when first and second DC power supplies 341 and 342 are deactivated. A manually-operable means 346*i* is provided for independently activating third DC power supply 343 through requesting control circuit 345 to turn on a switch 343 to energize independent power-distributing circuitry 370*i*. The other color coded connector can be further connected to another CD drive (not show), so that both CD drives can perform information reading and writing thus for providing an information-duplicating function without booting energy-conserving computer system 300 to provide a full or an energy-conserving operating function. Second DC power supply 342 is further arranged for receiving backup power from battery 312 and for providing a fourth DC power supply 342S to energize standby power-distributing circuitry 370S, when the energy-conserving operating function is provided.

In accordance with the third primary preferred embodiments, FIG. 3 shows energy-conserving computer system 300 having multiple operating functions, comprising (a) a first group of circuitry (in power connection with first power-distributing circuitry 370H) actuatable for providing a first operating function, wherein the first group of circuitry comprises main microprocessor circuitry 372H and means 389 for cooling main microprocessor circuitry 372H; (b) a second group of circuitry (in power connection with second power-distributing circuitry 370L) actuatable for providing a second operating function that does not require to activate main microprocessor circuitry 372H and means 389 for cooling; (c) a third group of circuitry 370S (in power connection with third power-distributing circuitry) actuatable for providing a standby function in which at least the first group of circuitry is deactivated, wherein the third group of circuitry comprises standby circuitry (including control circuitry 373, standby RAM 323S, communication card 379S, and external input means such as keyboard 354 and mouse 355) for rendering at least the first group of circuitry reactuatable to resume previous activities; (d) power providing means 315 for providing power to the first group of circuitry, the second group of circuitry, and the third group of circuitry; and (e) control means (which may include control circuit 345, switch means 341R–343R, and control circuitry 373) for controlling power providing means 315 to selectively activate or energize the first group of circuitry, the second group of circuitry, and the third group of circuitry, so as to respectively provide the first operating function, the second operating function, and the standby function. Preferably, the first group of circuitry further comprises main RAM 323H, main video circuitry 374H, and other expansion slots 374H–378H. The second group of circuitry comprises auxiliary microprocessor circuitry 372L, volatile memory storage (or RAM) 323L, nonvolatile memory storage (such as batter-powered random-access memory, hard-disk drive 351, optical CD drive 353, and their combinations), and auxiliary video circuitry 374L, so that the information-processing apparatus is rendered energy-conserving, less noisy, and fully operable, without requiring to activate main microprocessor circuitry 372H, means 389 for cooling and cooling fan 319, when the second operating function is provided. Power providing means 315 comprises at least one power provider selected from the group consisting of non-rechargeable and/or rechargeable battery 312, power circuitry 330 for generating DC power from AC power, and their combinations, for providing first DC power supply 341 at least to power line 341H, second DC power supply 342 at least to power line 342L and to power line 342S (also referred to as fourth DC power supply 342S mentioned hereinabove), third DC power supply 343 at least to power line 343i, and their power combinations respectively to the first group of circuitry, the second group of circuitry, the third group of circuitry, and their group combinations. Fourth DC power supply 342S that also receives backup power from battery 312 is used to render standby RAM 323S keep-alive for serving as nonvolatile memory storage to store task information needed for resuming previous activities.

The control means is adapted for controlling the power providing means in such a manner as selectively to deactivate or to activate the first group of circuitry when detecting an activity of main microprocessor circuitry 372H is below or not below a preset value, respectively. Third DC power supply 343i is also arranged as an independent DC power supply for energizing an independent group of circuitry in power connection with independent power-distributing circuitry 370i to provide an independent energy-conserving operating function. The control means is further adapted to control the power providing means for selectively (i) activating the first group of circuitry, the second group of circuitry, and the third group of circuitry at the same time to provide the full operating function, (ii) activating the second group of circuitry and the third group of circuitry without activating the first group of circuitry to provide the energy-conserving operating function, (iii) activating only the second group of circuitry to provide the independent energy-conserving operating function, and (iv) activating only the third group of circuitry to provide the standby function. The control means may comprise a first means 341 actuatable in response to a signal to control the power providing means for selectively activating or deactivating the first group of circuitry and a second means 381 manually-operable to control the power providing means for selectively activating or deactivating the second group of circuitry. Specifically, optical CD drive 353 and independent group of circuitry are arranged (1) for providing a music playing function and (2) for providing an information-duplicating (i.e., reading and writing) function with another optical CD drive at a condition when the first group of circuitry, the second group of circuitry, and the third group of circuitry are all deactivated.

Alternatively, energy-conserving computer system 300 may be a notebook, laptop, or portable computer in which its power providing means comprises rechargeable battery 312 and its control means is adapted to control rechargeable battery 312 for not energizing the first group of circuitry when detecting an activity of main microprocessor circuitry 372H is below a preset value, so as to conserve the power of rechargeable battery 312 during operation. Furthermore, provided in FIG. 3 is a central processor unit 372 integrated with main microprocessor circuitry 372H comprised in the first group of circuitry and auxiliary microprocessor circuitry 372L comprised in the second group of circuitry. Means 389 for cooling and cooling fan 319 may be rendered temperature sensitive so as to be actuated only when the temperature of a preselected area exceeds a preset value.

Figure 4:
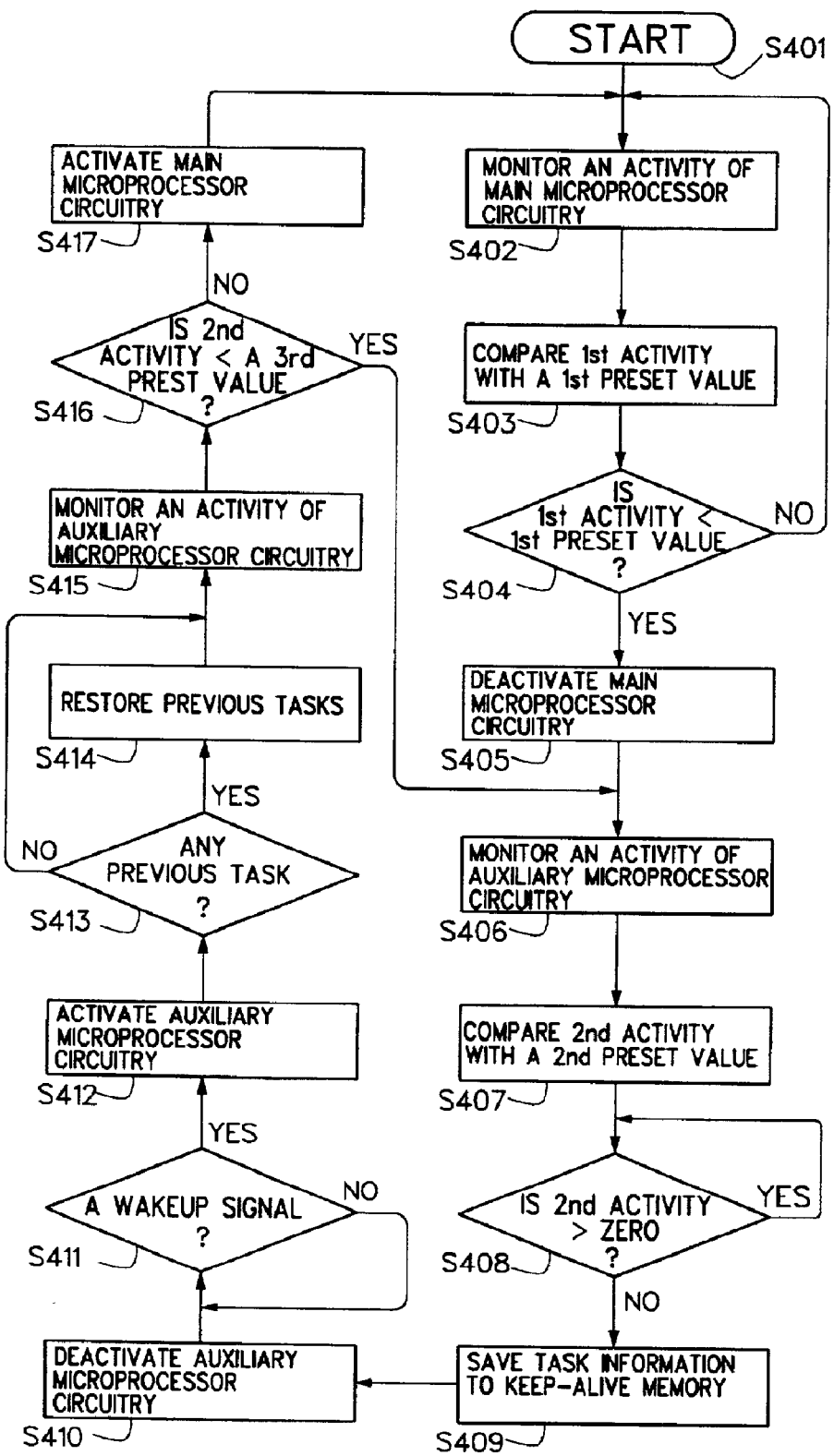
FIG. 4 is a flowchart showing an operating system for controlling an energy-conserving computer to selectively operate at a full operating state and an energy-conserving operating state, in accordance with a forth primary preferred embodiment of the present invention.

Referring now to FIG. 4, a fourth primary embodiment of the present invention is an operating system for rendering energy-conserving computer systems 100, 200 and 300 each capable of selectively providing at least a full operating function or an energy-conserving operating function. Note that "S"shown in FIG. 4 stands for "Step" hereinafter and the illustration is exemplarily based on FIG. 3. Preferably, the operating system is an APM OS driver and various APM BIOS routines hardwired to a random access memory chip that has connecting pins for establishing communication with a computer motherboard. Alternatively, the operating system may be a set of basic instructions loaded to standby RAM 323S through software installation so as to be in the background or resident in keep-alive memory. In either case, it will be readily executable by auxiliary microprocessor circuitry 372L, once energy-conserving computer system 300 is powered at the first time (S401). When a full operating function is provided, S402, an activity of main microprocessor circuitry 372H defined as a first activity is monitored, for instance by auxiliary microprocessor circuitry 372L. A value representing the first activity monitored is generated. S403 compares the value of the first activity with a first preset value stored in standby RAM 323S. If the value of the first activity is smaller or less than the first preset value, S404, a request signal to deactivate main microprocessor circuitry 372H (and thus first power-distributing circuitry) is issued in S405 from auxiliary microprocessor circuitry 372L to control circuitry 373 then to control circuit 345 to deactivate first DC power supply 341. If not, the process is routed to S402 for further monitoring. S406 monitors an activity of auxiliary microprocessor circuitry 372L, which is defined as the value of a second activity for comparison with a second preset value as shown in S407. Should the value of the second activity be no greater than zero (S408), task information of auxiliary microprocessor circuitry 372L will be saved to standby RAM 323S which serves as keep-alive memory (S409) and will be deactivated (S410) so as to enter a standby or suspend state. Preferably, an additional instruction is provided for granting the deactivation of auxiliary microprocessor circuitry either through a manual request or a time factor before entering the standby state. During the standby state, control circuitry 373 monitors if there exists a wakeup signal (S411). Should a wake-up signal be detected by control circuitry 373, auxiliary microprocessor circuitry 370L (and thus second power-distributing circuitry) will be activated (S412). Previous tasks or activities if exist will be restored (S413 and S414). The activity of auxiliary microprocessor circuitry 372L, which corresponds to the value of the second activity, will be monitored (S415) and compared (S416). If the value of the second activity is smaller than a third preset value (for instance, 95% which is higher than the first preset value), the process is routed to S406. If it is not smaller than the third preset value and especially for an extended period of time (i.e., a time factor) longer than a preset time value, S417 is executed to activate main microprocessor circuitry 372H (and thus first power-distributing circuitry) as computation is beyond the power of auxiliary microprocessor circuitry 372L. Preferably, a time value of 3 seconds rather than 3 microseconds is set to ignore a momentary demand in high-power computation. Alternatively, additional instructions are provided for allowing a user to set the preset time value. Finally, once the full operating function is provided, the process returns to S402 so as to restart the monitor and control process. With the operating system, energy-conserving computer system 300 can be (1) powered down by deactivating the full operating function, (2) placed in a standby function by deactivating both the full and the energy-conserving operating functions, (3) powered up energy conservatively by activating the energy-conserving operating function alone, and (4) powered up fully by activating both the full and the energy-conserving operating functions.

It is important to note that energy-conserving computer system 100, 200, and 300 of the present invention each is capable of providing an energy-conserving operating function and/or an independent operating function that allows either computation to proceed or audio information to be produced, at a condition especially when entering the so-called standby or suspend state. No new terminology is created for such a description of "operating" because it is clear that only the energy-conserving power-supply system, motherboard, computer system, and operating system of the present invention can provide such an operating function when entering the standby, the suspend, or the shutdown state. On the contrary, the conventional computer and the conventional operating system allow no such an operating activity to proceed except for waiting a wakeup request signal when entering the standby or the suspend state.

Although these preferred embodiments have been described hereinbefore as a computer power-supply system, computer motherboard (or system board), computer system for applications on personal desktop and portable computer, the present invention is also applicable to other applications on servers, super computer systems as well as to any information-processing apparatus for providing the multiple operating functions. Thus, it is clearly understood that such embodiments are provided by way of illustration and example only and are not to be taken by way of limitation as numerous variations, changes, modification, and substitutions will occur to those skilled in the art without departing from the invention herein. Accordingly, it is intended that the invention be limited only by the spirit and scope of the appended claims.

What is claimed is:

1. An energy-conserving motherboard having multiple operating functions, comprising:
   (a) first power-distributing circuitry actuatable for providing a first operating function, wherein said first power-distributing circuitry is arranged for establishing power connection with main microprocessor circuitry;
   (b) second power-distributing circuitry actuatable for providing a second operating function that is not required to activate said main microprocessor circuitry;
   (c) third power-distributing circuitry actuatable for providing a standby function that is not required to actuate said first nor said second power-distributing circuitry, wherein said third power-distributing circuitry is arranged for establishing power connection with keep-alive memory circuitry for storing information needed for resuming said first operating function or said second operating function; and
   (d) control means for selectively activating or deactivating said first power-distributing circuitry and said second power-distributing circuitry, so as to selectively provide said first operating function, said second operating function and said standby function, wherein said control means is arranged for having power connection with said third power-distributing circuitry.

2. The energy-conserving motherboard of claim 1, wherein said first power-distributing circuitry is arranged for establishing power connection further with means for cooling said main microprocessor circuitry.

3. The energy-conserving motherboard of claim 1, wherein said second power-distributing circuitry is arranged for establishing power connection with auxiliary microprocessor circuitry, random access memory circuitry, nonvolatile memory storage, and auxiliary video circuitry, so as to provide said second operating function for performing information processing without activating said first power-distributing circuitry.

4. The energy-conserving motherboard of claim 3, wherein said control means is adapted in a manner for activating said first power-distributing circuitry when detecting an activity of said auxiliary microprocessor circuitry is above a preset value.

5. The energy-conserving motherboard of claim 1, wherein said second power-distributing circuitry is arranged for establishing power connection with audio circuitry so as to provide said second operating function for producing audio information without activating said main microprocessor circuitry.

6. The energy-conserving motherboard of claim 1, wherein said control means is adapted in a manner for firstly reactivating said second power-distributing circuitry to provide said second operating function when detecting a reactivating signal.

7. The energy-conserving motherboard of claim 1 further comprising third power-distributing circuitry for providing a standby function to allow at least said first power-distributing circuitry when deactivated to be reactuatable for re-providing at least said first operating function, wherein said third power-distributing circuitry is arranged for establishing power connection with standby circuitry for detecting a reactivating signal.

8. The energy-conserving motherboard of claim 7, wherein said third power-distributing circuitry is arranged for establishing power connection further with keep-alive memory circuitry for storing information needed for resuming activities associated with said first operating function.

9. The energy-conserving motherboard of claim 1, wherein said control means is adapted in a manner for activating said second power-distributing circuitry at a condition selected from the group consisting of when said first power-distributing circuitry is activated or deactivated, when said third power-distributing circuitry is activated or deactivated, and their combinations.

10. The energy-conserving motherboard of claim 1, wherein said control means is adapted in a manner for selectively (i) activating said first power-distributing circuitry and said second power-distributing circuitry at the same time to provide a full operating function, (ii) activating said second power-distributing circuitry and said third power-distributing circuitry without activating said first power-distributing circuitry to provide an energy-conserving operating function, (iii) activating only said second power-distributing circuitry to provide an independent energy-conserving operating function, and (iv) activating only said third power-distributing circuitry to provide only said standby function.

11. The energy-conserving motherboard of claim 1, wherein said control means is adapted in a manner for deactivating said first power-distributing circuitry when detecting an activity of said main microprocessor circuitry is below a preset value.

12. The energy-conserving motherboard of claim 1, wherein said control means comprises a first means actuatable in response to a signal for selectively activating or deactivating said first power-distributing circuitry and a second means manually-operable for selectively activating or deactivating said second power-distributing circuitry.

13. An information-processing apparatus having multiple operating functions, comprising:
   (a) a first group of circuitry actuatable for providing a first operating function, wherein said first group of circuitry comprises main microprocessor circuitry;
   (b) a second group of circuitry actuatable for providing a second operating function that is not required to activate said main microprocessor circuitry;
   (c) a third group of circuitry actuatable for providing a standby function to allow at least said first group of circuitry when deactivated to be reactuatable for providing said first operating function, wherein said third group of circuitry comprises keep-alive memory circuitry for storing information needed for resuming said first operating function or said second onerating function;
   (d) power providing means for providing power at least to said first group of circuitry, said second group of circuitry, and said third group of circuitry; and
   (e) control means for controlling said power providing means to selectively activate said first group of circuitry, said second group of circuitry, and said third group of circuitry, so as to respectively provide said first operating function, said second operating function, and said standby function.

14. The information-processing apparatus of claim 13, wherein said first group of circuitry further comprises means for cooling said main microprocessor circuitry.

15. The information-processing apparatus of claim 13, wherein said second group of circuitry comprises audio circuitry, so as to provide said second operating function for producing audio information without activating said main microprocessor circuitry.

16. The information-processing apparatus of claim 13, wherein said second group of circuitry comprises auxiliary microprocessor circuitry, volatile memory storage, nonvolatile memory storage, and auxiliary video circuitry, so as to provide said second operating function for performing information processing without activating said main microprocessor circuitry.

17. The information-processing apparatus of claim 16, wherein said nonvolatile memory storage is selected from the group consisting of battery-powered random-access memory, at least one hard-disk drive, at least one optical disc drive, and their combinations.

18. The information-processing apparatus of claim 16, wherein said control means is adapted for controlling said power providing means to activate said first group of circuitry when detecting an activity of said auxiliary microprocessor circuitry is above a preset value.

19. The information-processing apparatus of claim 13, wherein said third group of circuitry comprises (i) said keep-alive random access memory for storing task information to be reactivated and (ii) control circuitry responsive to a reactivating signal for restoring said task information, so as to provide said standby function for deactivating and reactivating said task information.

20. The information-processing apparatus of claim 13, wherein said third group of circuitry is adapted to comprise said keep-alive random access memory for storing task information to be reactivated and said control means is adapted to comprise standby circuitry responsive to a reactivating signal for restoring said task information, so as to provide said standby function for deactivating and reactivating said task information respectively associated with said first operating function and said second operating function.

21. The information-processing apparatus of claim 13, wherein said power providing means comprises at least one power provider selected from the group consisting of non-rechargeable battery, rechargeable battery, power circuitry for generating DC power from AC power, and their combinations, for providing a first DC power supply, a second DC power supply, a third DC power supply, and their power combinations respectively to said first group of circuitry, said second group of circuitry, said third group of circuitry, and their group combinations.

22. The information-processing apparatus of claim 13, wherein said power providing means is adapted to comprise power circuitry for inputting AC power and for converting said AC power selectively to a first DC power supply, a second DC power supply, a third DC power supply, and their power combinations respectively to said first group of circuitry, said second group of circuitry, said third group of circuitry, and their group combinations.

23. The information-processing apparatus of claim 13, wherein said power providing means comprises rechargeable battery and said control means is adapted for controlling said rechargeable battery not to energize said first group of circuitry when detecting an activity of said main microprocessor circuitry is below a preset value, so as to conserve the power of said rechargeable battery.

24. The information-processing apparatus of claim 13, wherein said control means is arranged to have power connection with said third group of circuitry so as to be energized for controlling said power providing means to selectively reactivate said first group of circuitry and said second group of circuitry, when said standby function is provided.

25. The information-processing apparatus of claim 13, wherein said control means is adapted for controlling said power providing means to deactivate said first group of circuitry when detecting an activity of said main microprocessor circuitry is below a preset value.

26. The information-processing apparatus of claim 13, wherein said control means is adapted selectively (i) for activating at least said first group of circuitry and said second group of circuitry at the same time to provide a full operating function, (ii) for activating said second group of circuitry and said third group of circuitry without activating said first group of circuitry to provide an energy-conserving operating function, (iii) for activating only said second group of circuitry to provide an independent energy-conserving operating function, and (iv) for activating only said third group of circuitry to provide said standby function.

27. The information-processing apparatus of claim 13, wherein said control means comprises (i) a first means actuatable in response to a signal for controlling said power providing means to selectively activate or deactivate said first group of circuitry, and (ii) a second means manually-operable for controlling said power providing means to selectively activate or deactivate said second group of circuitry.

28. The information-processing apparatus of claim 13 further comprising a central processor unit that comprises said main microprocessor circuitry comprised in said first group of circuitry and auxiliary microprocessor circuitry comprised in said second group of circuitry.

29. The information-processing apparatus of claim 13 further comprising an optical disc drive and a fourth group of circuitry arranged for providing an audio-reproduction function at a condition when said first group of circuitry, said second group of circuitry, and said third group of circuitry are all deactivated.

30. The information-processing apparatus of claim 13, further comprising at least two optical disc drives and a fourth group of circuitry arranged for providing a read and write function therebetween at a condition when said first group of circuitry, said second group of circuitry, and said third group of circuitry are all deactivated.

31. The information-processing apparatus of claim 13 further comprising (i) a motherboard for disposing said first group of circuitry, said second group of circuitry, and said third group of circuitry, (ii) an optical disc drive having power connection with said second group of circuitry, and (iii) audio circuitry comprised in said second group of circuitry, so as to provide said second operating function for producing audio information even at a condition when said first group of circuitry and said third group of circuitry are both deactivated.

* * * * *